United States Patent
Griffith (10) Patent No.: US 8,834,773 B1
(45) Date of Patent: Sep. 16, 2014

(54) THERMALLY EFFICIENT TOOLING FOR COMPOSITE COMPONENT MANUFACTURING

(71) Applicant: The Boeing Company, Chicago, IL (US)

(72) Inventor: John M. Griffith, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/645,052

(22) Filed: Oct. 4, 2012

Related U.S. Application Data (62) Division of application No. 12/022,263, filed on Jan. 30, 2008, now Pat. No. 8,337,192.

(51) Int. Cl.
*B29C 33/38* (2006.01)
*B29C 35/04* (2006.01)

(52) U.S. Cl.
USPC .......... 264/337; 264/338; 264/257; 264/258; 425/470; 249/111

(58) Field of Classification Search
CPC ................................ B29C 33/38; B29C 35/04
USPC ......... 264/316, 239, 257, 258, 299, 337, 338; 425/470; 249/111
See application file for complete search history.

(56) References Cited

U.S. PATENT DOCUMENTS

| | | | |
|---|---|---|---|
| 3,283,520 A | 11/1966 | Donohue et al. | |
| 3,734,449 A | 5/1973 | Itou et al. | |
| 4,744,849 A | 5/1988 | Michaud-Soret | |
| 5,064,597 A | 11/1991 | Kim | |
| 5,458,818 A | 10/1995 | Kim et al. | |
| 6,276,656 B1 | 8/2001 | Baresich | |
| 6,855,917 B2 | 2/2005 | Kirkwood et al. | |
| 2009/0191345 A1 | 7/2009 | Griffith | |

FOREIGN PATENT DOCUMENTS

| | | |
|---|---|---|
| EP | 1236554 A1 | 9/2002 |
| EP | 2211853 T3 | 7/2004 |
| WO | 2009097297 A1 | 8/2009 |

OTHER PUBLICATIONS

International Search Report and Written Opinion of the International Searching Authority, dated May 8, 2009, regarding Application No. PCT/US2009/032167 (WO2009097297), 12 pages.
Office Action, dated Dec. 10, 2010, regarding USPTO U.S. Appl. No. 12/022,263, 15 pages.
Response to Office Action, dated Feb. 18, 2011, regarding USPTO U.S. Appl. No. 12/022,263, 14 pages.
Final Office Action, dated Apr. 29, 2011, regarding USPTO U.S. Appl. No. 12/022,263, 14 pages.
Amendment Pursuant to Request for Continued Examination, dated Jul. 11, 2011, regarding USPTO U.S. Appl. No. 12/022,263, 13 pages.
Notice of Allowance, dated Aug. 24, 2012, regarding USPTO U.S. Appl. No. 12/022,263, 12 pages.

*Primary Examiner* — Richard Crispino
*Assistant Examiner* — Elizabeth Royston
(74) *Attorney, Agent, or Firm* — Yee & Associates, P.C.

(57) ABSTRACT

A method and apparatus for manufacturing composite components. A tool is present for use in manufacturing composite components. The tool comprises an encapsulation layer having a shape, an insulation layer on the encapsulation layer, and an isolation layer on the insulation layer. The isolation layer has an outer surface capable of contacting a composite material laid up on the outer surface. The insulation layer is capable of insulating the encapsulation layer from heat applied to the composite material. The encapsulation layer is capable of maintaining a shape with the composite material laid up on the isolation layer during a curing process to form a composite component from the composite material.

8 Claims, 4 Drawing Sheets

THERMALLY EFFICIENT TOOLING FOR COMPOSITE COMPONENT MANUFACTURING

This application is a divisional of U.S. application Ser. No. 12/022,263, entitled "Thermally Efficient Tooling for Composite Component Manufacturing," filed on Jan. 30, 2008 status Allowed.

BACKGROUND INFORMATION

1. Field

The present disclosure relates generally to composite components and in particular to a method and apparatus for manufacturing composite components. Still more particularly the present disclosure relates to a method, apparatus, for manufacturing a composite component using a tool.

2. Background

Aircraft are being designed and manufactured with greater and greater percentages of composite materials. Some aircraft may have more than fifty percent of their primary structure made from composite materials. Composite materials are used in aircraft to decrease the weight of the aircraft. This decreased weight improves performance features, such as payload capacities and fuel efficiencies. Further, composite materials provide longer service life for various components in an aircraft.

Composite materials are tough, light-weight materials, created by combining two or more dissimilar components. For example, a composite may include fibers and resins. The fibers and resins are combined and cured to form a composite material.

Further, by using composite materials, portions of an aircraft may be created in larger pieces or sections. For example, a fuselage in an aircraft may be created in cylindrical sections that may be put together to form the fuselage of the aircraft. Other examples include, for example, without limitation, wing sections joined to form a wing, stabilizer sections joined to form a stabilizer, a stiffener, a fairing, a control surface, a skin, a skin section, a door, a strut, and a tubular structure.

Currently, many composites in a manufactured aircraft require an autoclave to cure the composite components. An autoclave is a heat source that provides both heat and pressure. Composite resins typically need an elevated temperature to achieve a chemical reaction that allows these resins to flow and cure. Pressure is typically applied to consolidate the materials in the part during resin flow. The temperature typically used is usually greater than 150 degrees Fahrenheit (typically about 350 degrees Fahrenheit) with the pressure greater than one atmosphere.

Further, in manufacturing composite components, the materials typically are formed using a mold. These molds also are referred to as tools. A tool has sufficient rigidity to maintain the desired shape for the composite component when the composite materials are placed onto the tools. A tool may be metallic or non-metallic in composition to provide rigidity for supporting the composite materials.

With large components, a large autoclave is needed to encompass the component and the tool for processing. In some cases, these large components may be, for example, twelve to twenty feet in diameter and they weigh tons.

As a result, composite materials have been developed which require reduced heat and pressure to cure. Further, the amount of heat needed to cure these types of composite materials are typically at temperatures less than around 250 degrees Fahrenheit. Pressures are provided by vacuum and an oven and/or heated molds used as the heat source for chemical reactions.

SUMMARY

The different advantageous embodiments provide a method and apparatus for manufacturing composite components. In one advantageous embodiment, a tool is present for use in manufacturing composite components. The tool comprises an encapsulation layer having a shape, an insulation layer on the encapsulation layer, and an isolation layer on the insulation layer. The isolation layer has an outer surface capable of contacting a composite material laid up on the outer surface while maintaining the final part shape. The insulation layer is capable of insulating the isolation layer from taking away heat applied to the composite material. The encapsulation layer is capable of maintaining the shape with the composite material laid up on the isolation layer during a curing process to form a composite component from the composite material.

In another advantageous embodiment, an apparatus comprises an encapsulation layer having a shape and an insulation layer located over the encapsulation layer, wherein the insulation layer is capable of insulating the encapsulation layer from heat applied to a composite material and wherein the encapsulation layer is capable of maintaining the insulation layer shape with the composite material laid up over the insulation layer during a curing process to form a composite component.

In still another advantageous embodiment, a method is present for manufacturing a composite component. A composite material is placed on a tool comprising an encapsulation layer that maintains a shape for the composite component; an insulation layer on the encapsulation layer; and an isolation layer on the insulation layer, wherein the isolation layer has an outer surface in contact with the composite material laid up on the outer surface, wherein the insulation layer insulates the encapsulation layer from heat applied to the composite material, and wherein the encapsulation layer maintains the shape with the composite material laid up on the isolation layer during a curing process to form the composite component from the composite material. The composite material on the outer surface is cured to form the composite component.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
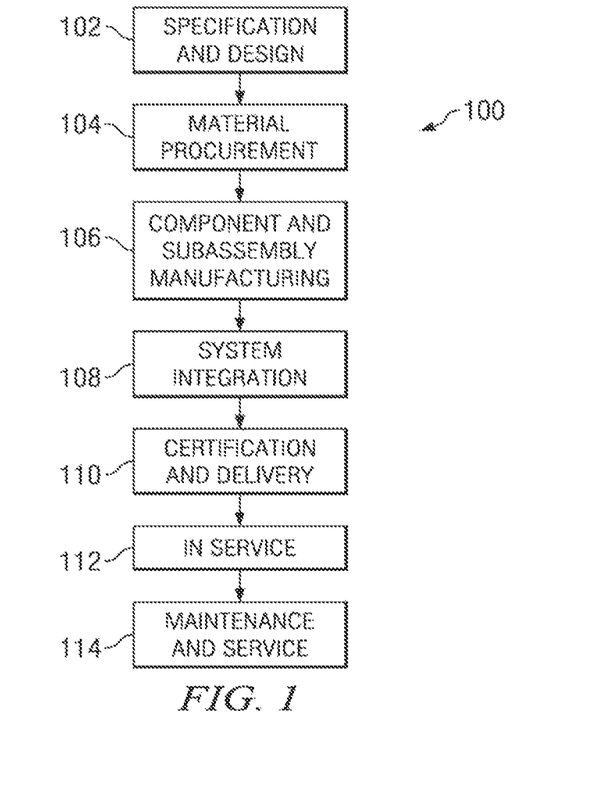
FIG. 1 is a diagram illustrating an aircraft manufacturing and service method in which an advantageous embodiment may be implemented.
Figure 2:
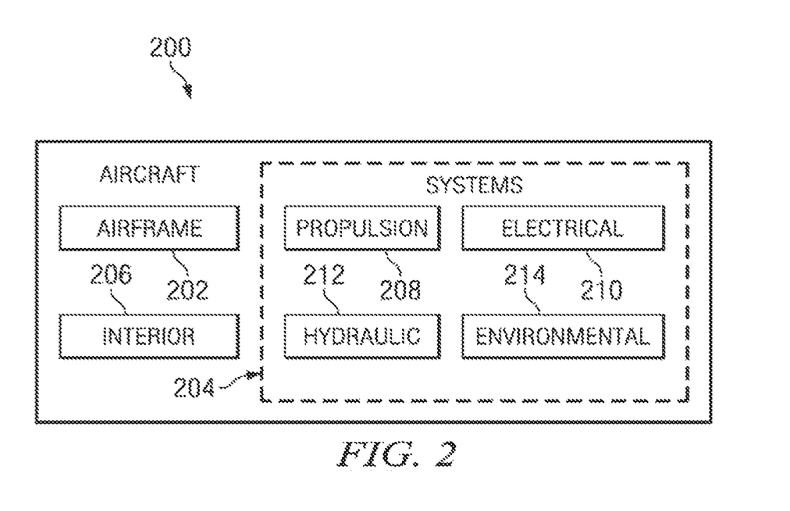
FIG. 2 is a diagram of an aircraft in accordance with an advantageous embodiment.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

The different advantageous embodiments recognize that with larger composite components, the larger tools on which these components sit have additional mass that absorbs heat when curing composite materials. With the large size of tools, a large thermal mass is typically present. This thermal mass of the tool may absorb the heat generated by the heat source away from the composite material. With the tool acting as a heat sink, the composite material takes more time to reach the desired temperature.

As a result, the amount of time needed to reach the appropriate temperature to cure a composite material increases. This increased heating time is also referred to as thermal lag and increases as the mass of the tool. With curing systems using lower temperatures applied by ovens or localized heat, the amount of time needed to cure these types of composite components is greater as compared to those cured in autoclaves.

The problem increases in these types of curing systems because with less heat being applied, more time is needed to cure the composite materials with the lower temperatures. This problem is present even with localized heating systems applied to the composite side because the tool acts as a heat sink and pulls heat away from the composite material.

Therefore, the different advantageous embodiments recognize that improvements to the current system for manufacturing composite components are needed to decrease the amount of time needed to manufacture components.

The different advantageous embodiments provide a method and apparatus for fabricating composite components. The different advantageous embodiments recognize that removing or minimizing the tool as a heat sink may reduce the time needed to heat a composite material to the needed temperature to cure that material.

As a result, in the different advantageous embodiments, a tool may be used to fabricate composite components in which the tool includes an encapsulation layer, an insulation layer, and an isolation layer. The encapsulation layer is capable of maintaining the isolation and/or insulation layer shape while curing a load from a composite material laid up on the tool to yield a proper shaped composite component.

The insulation layer is formed on or over the encapsulation layer and the isolation layer is formed on or over the insulation layer. The isolation layer has an outer surface that is capable of contacting the composite material laid up on the outer surface. The insulation layer is capable of insulating the isolation layer and the encapsulation layer from heat transfer when heat is applied to the composite material. In some embodiments, other materials or layers may be present between these layers. These other layers may have various functions such as, for example, binding two layers to each other.

Thus, less heat is conducted away from the composite material to the isolation layer with the use of an insulation layer. The isolation layer may be formed from an insulator or a thermal conductor. When a thermal conductor is used, the isolation layer is configured such that heat applied to the composite material and the tool is distributed by the isolation layer to other areas on which the composite material is laid up on the outer surface. In this manner, the isolation layer also may provide a function in which more uniformed heating occurs.

Figure 3:
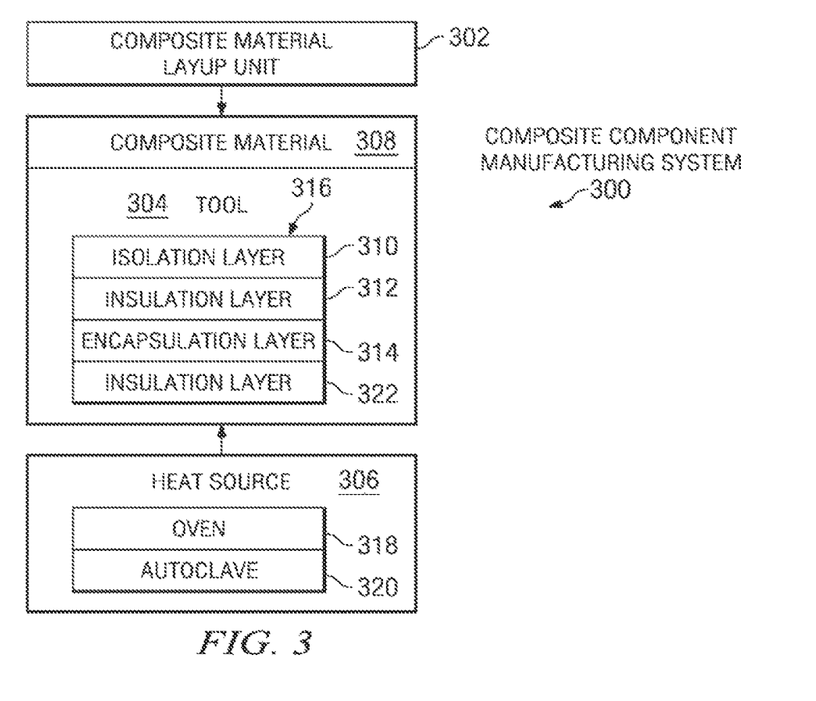
FIG. 3 is a diagram of a composite component manufacturing system in accordance with an advantageous embodiment.

With reference now to FIG. 3, a diagram of a composite component manufacturing system is depicted in accordance with an advantageous embodiment. Composite component manufacturing system 300 includes composite material layup unit 302, tool 304, and heat source 306. Composite component manufacturing system 300 may be used to manufacture various types of composite components. For example, composite components may be manufactured for aircraft. Examples of composite components may include, for example, sections of a fuselage, an airframe, skin panels, and other suitable components.

Composite material layup unit 302 may place or layup composite material 308 onto tool 304. Composite material layup unit 302 may take various forms. For example, composite material layup unit 302 may be hand layup or automated tape layup machine or system, such as, for example, a M. Torres layup, which is a tape lay up machine available from M. Torres. Another example is Access-Atlas which is a composite working machine available from Forest-Line. Yet another example of a machine that may be used is an Ingersoll Automated Tape Lamination Machine (ATLM), which is available from Ingersoll Machine Tools, Inc. Another example is an Automated Fiber Placement Machine (AFPM). Of course, any type of system or machine that may layup composite materials, such as tape, fabric, and/or any other suitable material may be used to implement composite material layup unit 302.

In these examples, tool 304 has a configuration that reduces the thermal lag that may be encountered during curing of composite material 308. Tool 304 may take various forms, for example, tool 304 may be an inner mold line or an outer mold line. Tool 304 may have less thermal mass than other tools that may be used to layup composite materials. With less thermal mass, tool 304 may heat up to the desired temperature more quickly than currently used tools. Further, tool 304 also may be structured to function less like a heat sink and more like an insulator with respect to the portions of tool 304 that contact composite material 308.

As depicted, tool 304 includes isolation layer 310, insulation layer 312, and encapsulation layer 314. In these examples, isolation layer 310 has outer surface 316, which is capable of contacting composite material 308. In other words, composite material 308 is laid up on outer surface 316 of isolation layer 310. Isolation layer 310 may be a low thermal diffusivity material or a high thermal diffusivity material. In other words, isolation layer 310 may be formed from either a thermal insulator or a thermal conductor, depending on the particular implementation.

Thermal diffusivity may be calculated as follows:

$$A = k/\rho c_p$$

Where a=Thermal Diffusivity; k=Thermal Conductivity; ρ=Density; and $c_p$=Specific Heat Capacity. When selecting materials for use of a thermal insulator, such as that for isolation layer 310 or insulation layer 312, a thermal diffusivity range of around less than 2.5E-06 m²/sec. In selecting a material for a thermal conductor, the material may be selected as having a thermal diffusivity greater than around 2.5E-06 m²/sec.

Insulation layer 312 is made of materials having low thermal conduction or diffusivity in these examples. This layer may be made from various materials and have various shapes. For example, a honeycombed shape, or foam may be used. Additional examples of materials that may be used are discussed below.

Encapsulation layer 314 provides the rigidity for tool 304 and maintains the shape of tool 304 while curing composite material 308 laid up on outer surface 316. Encapsulation layer 314 may be made from either an insulator, conductor, depending on the particular implementation. Insulation layer 312 may be used to prevent or reduce heat applied to the composite material from conducting through tool 304 to encapsulation layer 314. When heat is not conducted away from composite material 308, the time needed to heat composite material 308 to a temperature needed to cure composite material 308 may be reduced.

Heat source 306 may heat composite material 308 laid up on outer surface 316 of tool 304. By curing composite material 308 on tool 304, composite material 308 maintains the shape of tool 304. Heat source 306 may take various forms. For example, heat source 306 may be generated by oven 318 or autoclave 320. Oven 318 provides heat while autoclave 320 provides heat and pressure to composite material 308 and tool 304.

Of course, other types of heat sources may be used, depending on the particular implementation. For example, in addition to thermal curing as provided by oven 318 and autoclave 320, other types of curing processes may be employed. As another example, an electron beam system may be used to cure composite material 308 to form the composite component. Heat source 306 may be implemented using any currently available heat source. For example, an anchor autoclave from Anchor Autoclave Systems may be used or a composite curing autoclave from Taricco Corporation may be used.

With the use of tool 304, the amount of time needed to bring composite material 308 to the desired temperature for curing may be reduced. This reduction of time may occur because of the reduced thermal mass of tool 304. With the configuration of tool 304 in these examples, the amount of heat conducted away from composite material 308 to other layers of tool 304 is reduced. When isolation layer 310 is thermally conductive, the heat is redirected to other portions of composite material 308 rather than being conducted through other layers of tool 304.

Further, with less thermally conductive materials within tool 304 as compared to currently used tools, the amount of heat drawn into or needed to heat tool 304 to the temperature needed to allow the composite material to be cured may be reduced.

Additionally, the weight of tool 304 also may be reduced lessening structural concerns for floors on which composite component manufacturing system 300 may be located. As a result, faster cure times in oven 318 and autoclave 320 may be achieved. These faster cure times may result in reduced manufacturing costs, reduced work in process, and increased part quantities using tool 304 with the existing manufacturing systems.

Composite component manufacturing system 300 is depicted as one manner in which a manufacturing system may be implemented. Of course, other components may be present in addition to or in place of the ones illustrated in FIG. 3. For example, automated handling systems, composite material sources, computers, or other control mechanisms also may be present within composite material manufacturing system 300. As another example, additional members of composite material layup units and heat sources may be present within composite component manufacturing system 300.

In some advantageous embodiments, tool 304 may include insulation layer 322 located below encapsulation layer 314. Insulation layer 322 may further decrease the time needed to cure composite material 308 by providing further insulation to tool 304 when encapsulation layer 314 is a thermal conductor, such as metal.

Figure 4:
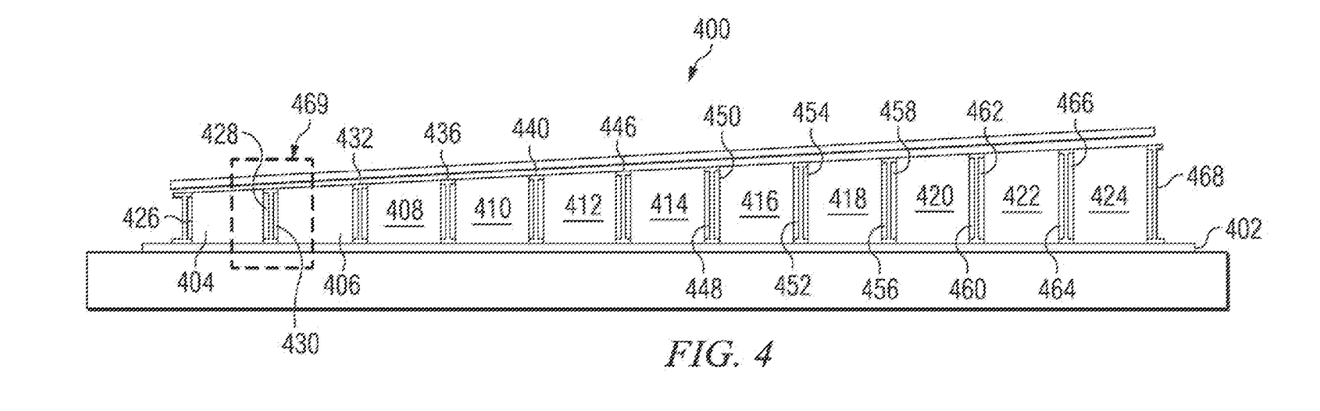
FIG. 4 is a diagram illustrating examples of tools in accordance with an advantageous embodiment.
Figure 5:
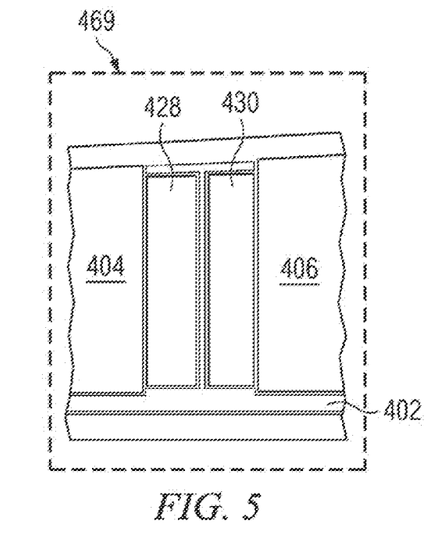
FIG. 5 is a more detailed diagram illustrating examples of tools in accordance with an advantageous embodiment.

Turning now to FIGS. 4 and 5, diagrams illustrating examples of tools are depicted in accordance with an advantageous embodiment. Tool 304 from FIG. 3 may take various forms. As can be seen in this example, wing 400 is a composite wing laid up using various tools. For example, bond jig 402, filler blocks 404, 406, 408, 410, 412, 414, 416, 418, 420, 422, and 424 may be implemented using tools, such as tool 304 in FIG. 3. Additionally, filler blocks 426, 428, 430, 432, 436, 440, 446, 448, 450, 452, 454, 456, 458, 460, 462, 464, 466, and 468 may be implemented using a tool, such as tool 304 in FIG. 3.

FIG. 5 is a more detailed example of section 469 in FIG. 4. This section provides a more detailed illustration of some of the tools in FIG. 4, such as bond jig 402, filler block 404, filler block 406, filler block 428, and filler block 430.

These types of tools may be used to layup composite materials for various components, such as stiffeners and skin panels in wing 400. Although the particular types of forms for a tool are depicted in FIGS. 4 and 5, the different advantageous embodiments may be applied to any type of tool used to create composite components from composite materials using processes such as, for example, cure processes, cocure processes, co-bond processes, and bond processes.

Figure 6:
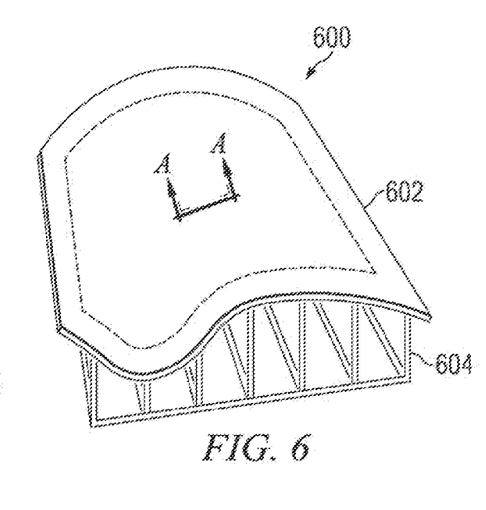
FIG. 6 is a diagram illustrating another example of a tool in accordance with an advantageous embodiment.

Turning now to FIG. 6, a diagram illustrating another example of a tool is depicted in accordance with an advantageous embodiment. In this example, tool 600 has composite material 602 laid up on tool 600 for a composite part. Tool 600 is located on stand 604. Tool 600 is comprised of materials having a cross-section or layer similar to tool 304 in FIG. 3. As can be seen, tool 600 provides the shape for the component that is formed from composite material 602.

Figure 7:
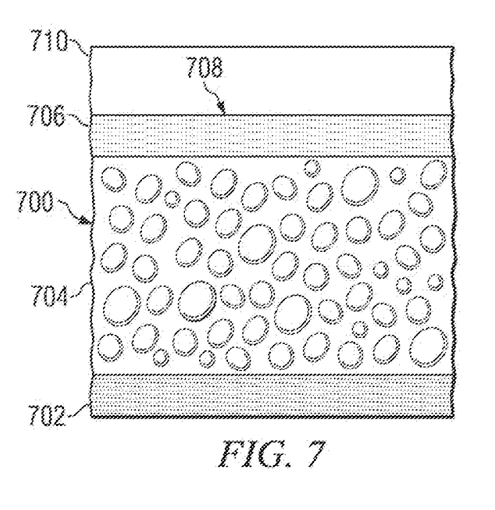
FIG. 7 is a diagram illustrating a cross-section of a tool in accordance with an advantageous embodiment.

With reference now to FIG. 7, a diagram illustrating a cross-section of a tool is depicted in accordance with an advantageous embodiment. In this example, cross-section 700 is an example of a cross-section from tool 600 in FIG. 6 taken along lines A-A. Layer 702 is an encapsulation layer, such as encapsulation layer 314 in FIG. 3. Layer 704 provides a cover for layer 702, which is an example of insulation layer 312 in FIG. 3. Layer 704 is formed between layer 702 and layer 706. Layer 706 is an example of an isolation layer, such as isolation layer 310 in FIG. 3.

Layer 706 has outer surface 708 which is a surface on which a composite material, such as layer 710, may be laid up or placed to form a composite component. Layer 710 is laid on outer surface 708. Layer 706 may be formed on layer 704 and may be made from different materials, such as an insulator or a conductor. When in the form of an insulator, layer 706 may be made from low thermal conduction materials, such as polymers, adhesives, films, elastomers, organic fibers, and inorganic fibers. When polymers are used, the polymers may be filled or unfilled.

Of course, any other suitable materials may be used for layer 706 depending on the implementation. Examples of inorganic materials include, for example, glass, Kevlar, and ceramic fibers with polymer matrix. Layer 706 may be made of a different material from layer 704 and/or may have a different structure. When using a thermal insulator, a low thermal conduction material may be selected. In these examples, a low thermal conduction material may have a thermal diffusivity of less than around 2.5E-06 $m^2$/sec.

When layer 706 takes the form of a thermal conductor, layer 706 may be made from various materials, such as, for example, metals, thermally conductive polymers, thermally conductive elastomers, or thermally conductive organic materials. Examples of metals that may be used include, for example, steel, aluminum, copper, and silver and alloys thereof. When a thermal conductor is used, a material having a high thermal conduction may be selected. This type of material may be one that has a thermal diffusivity that is greater than around 2.5E-06 $m^2$/sec.

With metals, solid metals, screens, or felts made of metals may be used. Further, layer 706 may be made from a combination of the different insulative or conductive materials. In these examples, layer 706 may be less than around 0.250 inches thick. When a thermal conductor is employed, the durability of layer 706 may be increased as compared to using a thermal insulator for layer 706.

Layer 704 may be made from various materials that have thermal insulation properties. Layer 704 may use a material having a thermal diffusivity of less than around 2.5E-06 $m^2$/sec. Layer 704 may be selected to provide thermal insulation for layer 702 and/or layer 706 while having a low mass or density to reduce weight. Layer 704 may be solid, porous, and/or include cavities. For example, layer 704 may take the form of foams, honeycombs, or fibers.

Further, layer 704 may comprise of at least one of foam, honeycombs, a sheet, and fibers in a polymer matrix. At least one of an item means that layer 704 may be made from foam, honeycombs, a sheet, foam and a sheet, foam and honeycombs, fibers in a polymer matrix, or some other combination of the items listed.

When foam is used, the foam may be made from organic or inorganic thermal insulators. The honeycombs may be made from materials such as, for example, metallic materials, non-metallic materials, thermal elastomer materials, and/or paper. The fibrous insulation materials may be, for example, fiberglass. An example of an organic material is balsa wood. In the depicted examples, layer 704 may have a thickness from around 0.250 inches to around 12 inches.

Layer 702 covers insulation layer 704 and provides a shape for the tool and an ability to control the shape of the composite part formed from the composite material in layer 710. In other words, layer 702 provides structural integrity to the different layers for handling and stability during the manufacturing of composite components to maintain the shape desired for the composite component.

Layer 702 may be made from various materials, such as organic materials or inorganic materials. The form of layer 702 may be a solid sheet of material, such as, for example, organic, inorganic, and/or metallic materials. As another example, metallic fibers within a polymer matrix may be used. Of course, any suitable form of material may be used that is capable of providing sufficient structural integrity to a tool for use in forming composite components. As depicted, layer 702 may have a thickness of around less than 0.250 inches.

In this manner, the configuration of layers 706, 704, and 702 provide a structure for creating a thermally efficient tool, such as tool 304 in FIG. 3. In these examples, a thermally efficient tool is a tool that reduces the amount of heat that the tool absorbs in a manner that reduces the amount of time needed to heat a composite component for curing as compared to currently used tools.

Although FIG. 7 depicts particular thermal diffusivity ranges, thickness for materials, types of materials, and form of materials, these examples are presented only for purposes of illustrating some of the advantageous embodiments. Other advantageous embodiments may use other thermal diffusivity levels and other ranges or thicknesses, depending on the particular implementation.

Figure 8:
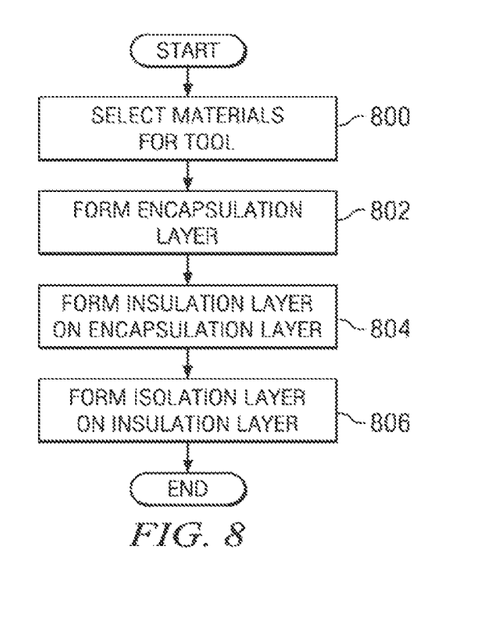
FIG. 8 is a flowchart of a process for creating a thermally efficient tool in accordance with an advantageous embodiment.

With reference now to FIG. 8, a flowchart of a process for creating a thermally efficient tool is depicted in accordance with an advantageous embodiment. The process illustrated in FIG. 8 may be used to create a tool, such as tool 304 in FIG. 3.

The process begins by selecting materials for the tool (operation 800). These materials may be a combination of insulators and thermally conductive materials as described above. Thereafter, the process forms an encapsulation layer (operation 802). Next, an insulation layer is formed on the encapsulation layer (operation 804). The process then forms an isolation layer on the insulation layer (operation 806), with the process terminating thereafter.

Of course, the construction of the different layers for a tool may vary depending on the particular embodiment. In some cases, the insulation layer may be formed first with the encapsulation layer and the isolation layer being placed on either side of the insulation layer. In some cases, the isolation layer may be formed first with the insulation layer formed on the isolation layer and the encapsulation layer formed on the insulation layer. In some cases, the isolation layer and the insulation layer and the encapsulation layer may be independently formed and then brought together to form the tool.

Figure 9:
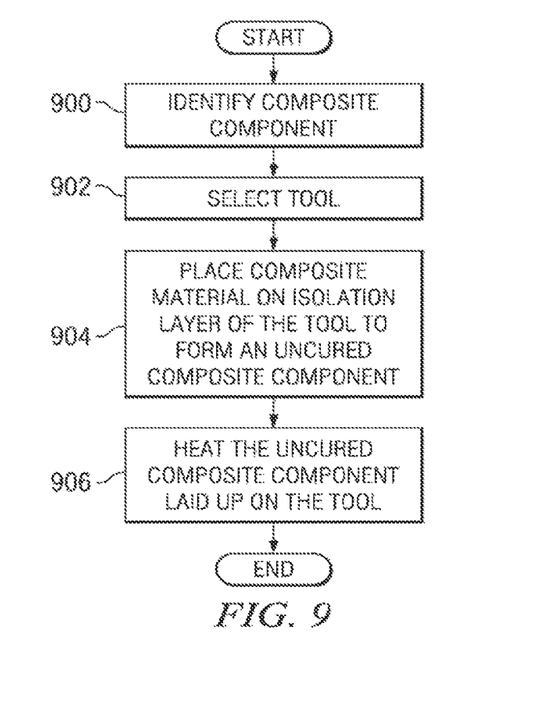
FIG. 9 is a flowchart of a process for manufacturing a composite component in accordance with an advantageous embodiment.

Turning now to FIG. 9, a flowchart of a process for manufacturing a composite component is depicted in accordance with an advantageous embodiment. The process illustrated in FIG. 9 may be implemented using a composite component manufacturing system, such as composite component manufacturing system 300 in FIG. 3.

The process begins by identifying a desired composite component (operation 900). Thereafter, a tool is selected for the identified composite component (operation 902). The composite material is placed on the isolation layer of the tool to form an uncured composite component (operation 904).

Thereafter, the uncured composite component laid up on the tool is heated to cure the composite material to form the composite component (operation 906), with the process terminating thereafter.

Figure 10:
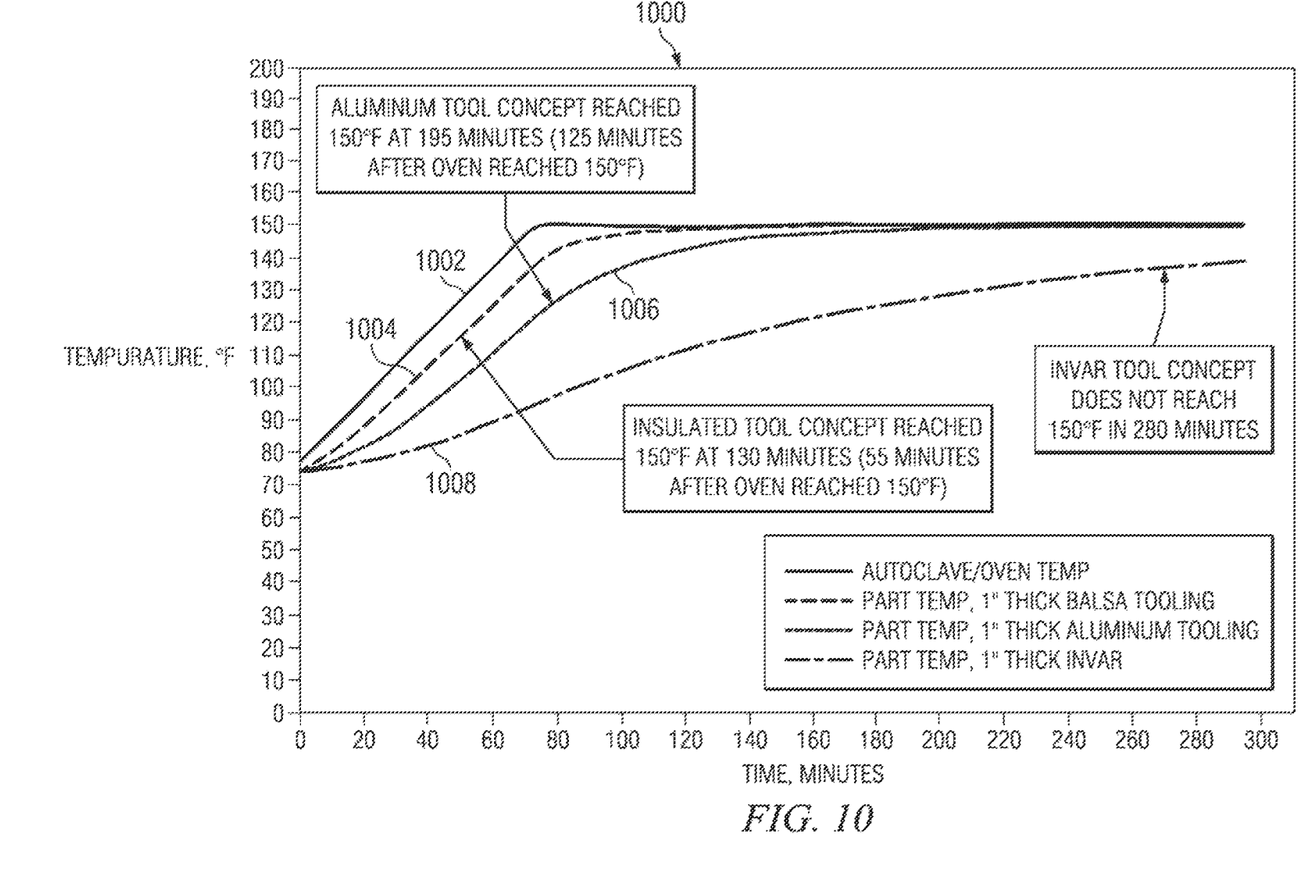
FIG. 10 is a graph illustrating time needed to heat a composite component in accordance with an advantageous embodiment.

Turning now to FIG. 10, a graph illustrating time needed to heat a composite component is depicted in accordance with an advantageous embodiment. Graph 1000 illustrates the time needed to heat tools to around 150 Fahrenheit degrees in an oven is depicted in accordance with an advantageous embodiment.

Line 1002 identifies the temperature in an oven. This line indicates the time needed for the oven to heat to various temperatures, such as 150 degrees. Line 1004 illustrates time needed for a tool constructed according to the advantageous embodiments to heat to 150 degrees. Using a tool in accordance with an advantageous embodiment, the tool reaches 150 degrees at one hundred and thirty minutes, which is around fifty five minutes after the over reaches 150 degrees.

Line 1006 illustrates time needed for a convention tool to be heated to 150 degrees. The aluminum tool represented by line 1006 reaches 150 degrees after one hundred and ninety five minutes, which is one hundred and twenty five minutes after the oven reached 150 degrees. As can be seen, the time needed for the conventional tool to heat to the appropriate temperature takes a longer amount of time as compared to a tool according to the advantageous embodiments. Line 1008 depicts the time needed to heat another tool that is commonly used for manufacturing composite components. The tool in line 1008 is made out of Invar®, which is generically referred to as 36FeNi. As can be seen, this tool does not reach 150 degrees within two hundred and ninety minutes.

Thus, the different advantageous embodiments provide a method and apparatus for creating composite components. In the different advantageous embodiments, a tool having an insulation layer and an encapsulation layer is used. Composite materials may be placed on the insulation layer in which the insulation layer prevents or reduces heat from conducting from the composite material to the encapsulation layer. As a result, thermal drive may be reduced in this manner.

In other advantageous embodiments, an isolation layer may be used in which the isolation layer is formed on the insulation layer and contacts the composite material. This isolation layer may be an insulator or a thermal conductor, depending on the particular implementation. When taking the form of a thermal conductor, the isolation layer may spread out the heat applied to the composite material. As a result, if more heat is applied in one section of the composite component, other sections may heat more evenly through the use of the isolation layer in a thermally conductive form.

In this manner, the amount of time needed to heat a composite material to the temperature needed to cure the material may be reduced by using a tool in accordance with an advantageous embodiment. As a result, the amount of time needed to create or manufacture a composite component also may be reduced. Although the different advantageous embodiments have been described with respect to manufacturing composite components for an aircraft, the different advantageous embodiments may be applied to manufacturing composite components for other types of apparatus. For example, the different advantageous embodiments may be used to manufacture composite components for spacecraft, submarines, ships, cars, trucks, manufacturing facilities, office buildings, and other structures.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for manufacturing a composite component, the method comprising:
    laying up a composite material on an outer surface of a tool, the tool comprising:
        an encapsulation layer having a shape for the composite component;
        a first insulation layer on the encapsulation layer, wherein the first insulation layer comprises one of a foam, honeycombs, a sheet, or fibers;
        a second insulation layer, wherein the encapsulation layer is positioned between the first insulation layer and the second insulation layer; and
        an isolation layer on the first insulation layer, wherein the isolation layer comprises the outer surface, contacts the composite material, and is configured to provide either insulation or conduction; and
    curing the composite material on the outer surface to form the composite component from the composite material, wherein the first insulation layer and the second insulation layer insulate the encapsulation layer from heat applied to the composite material, and wherein the encapsulation layer provides rigidity to the tool and maintains the shape of the tool during curing.

2. The method of claim 1, wherein the curing step comprises:
   curing the composite material on the outer surface in an autoclave.

3. The method of claim 1, wherein the curing step comprises:
   curing the composite material on the outer surface in an oven.

4. The method of claim 1, wherein the composite component is an aircraft part.

5. The method of claim 4, wherein the aircraft part is selected from one of a cylindrical section of a fuselage, a wing panel, a section of a stabilizer, a stiffener, a fairing, a control surface, a skin, a skin section, a door, a strut, and a tubular structure.

6. The method of claim 1, wherein the first insulation layer has a thermal diffusivity less than about 2.5E-06 $m^2$/sec.

7. The method of claim 1, wherein the insulation layer comprises a thermal insulation layer material selected from one of organic insulating material, inorganic insulating material, a polymer, an adhesive, an elastomer, glass, and a ceramic.

8. The method of claim 1, wherein the isolation layer comprises a thermal conducting material selected from a metal, a thermally conductive elastomer, a thermally conductive polymer, a thermally conductive organic material, and a metallic fiber.

* * * * *